(12) United States Patent
Hanamoto

(10) Patent No.: US 9,027,013 B2
(45) Date of Patent: May 5, 2015

(54) CONTROL PROGRAM UPDATING DEVICE AND STORAGE MEDIUM FOR STORING A CONTROL-PROGRAM UPDATING PROGRAM

(71) Applicant: Riso Kagaku Corporation, Tokyo (JP)

(72) Inventor: Yoshihiro Hanamoto, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 182 days.

(21) Appl. No.: 13/670,786

(22) Filed: Nov. 7, 2012

(65) Prior Publication Data

US 2013/0125106 A1    May 16, 2013

(30) Foreign Application Priority Data

Nov. 11, 2011    (JP) ................. 2011-247350

(51) Int. Cl.
  *G06F 9/44*    (2006.01)
  *G06F 9/445*    (2006.01)

(52) U.S. Cl.
  CPC ....................... *G06F 8/65* (2013.01)

(58) Field of Classification Search
  CPC .......................................................... G06F 8/65
  USPC ........................................................ 717/168
  See application file for complete search history.

(56) References Cited

U.S. PATENT DOCUMENTS 6,470,496 B1 * 10/2002 Kato et al. ..................... 717/173
8,555,273 B1 * 10/2013 Chia et al. ..................... 717/173
2008/0071942 A1 * 3/2008 Takamoto et al. ............... 710/19
2009/0193181 A1 * 7/2009 Sugino ........................... 711/103
2011/0107323 A1 * 5/2011 Hong ............................. 717/173
2012/0005442 A1 * 1/2012 Katano ........................... 711/163

FOREIGN PATENT DOCUMENTS

JP    2009-129333 A    6/2009

OTHER PUBLICATIONS

Patell, Piyush; "Downloading in Chunks using WCF and Silverlight"; CodeProject.com website; Sep. 7, 2010.*
Ye, Nong, et al.; "Job scheduling methods for reducing waiting time variance."; Computers & Operations Research 34.10 (2007): 3069-3083.*

* cited by examiner

*Primary Examiner* — Qing Chen
*Assistant Examiner* — Clint A Thatcher
(74) *Attorney, Agent, or Firm* — Nath, Goldberg & Meyer; Jerald L. Meyer; Katelyn J. Bernier

(57) ABSTRACT

A control program updating device includes: a divider that divides each control program into one or more split control programs, based on a program capacity that each of a high-volume paper feeding unit and a multiple post-processing unit can update in one updating operation; and a transmit controller that allows a communication interface to transmit a set of split control programs for each unit produced by the divider to the respective units in a predetermined order and, during updating of a split control program for one unit, transmit a split control program to the other unit in the following order.

4 Claims, 5 Drawing Sheets

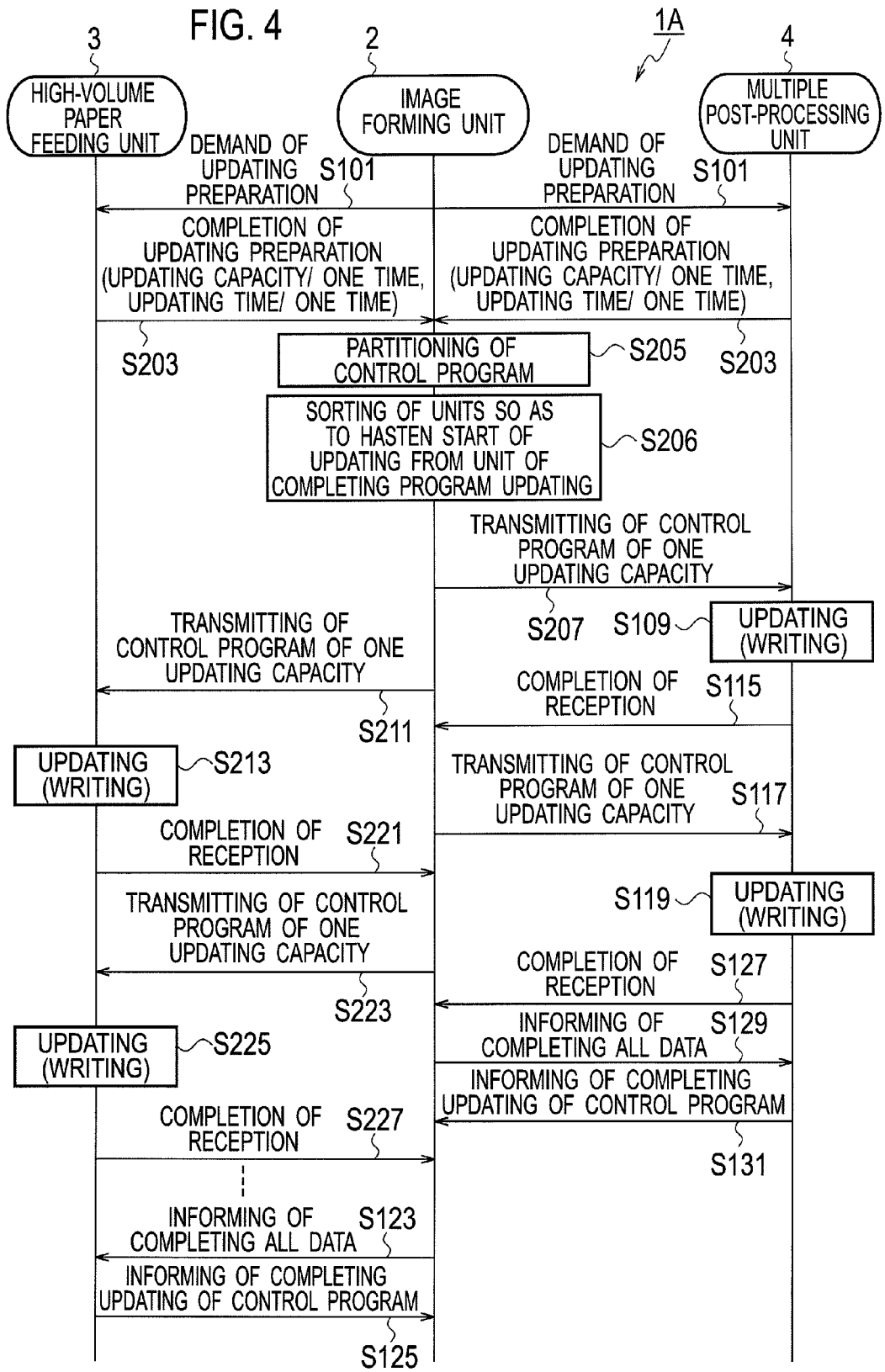

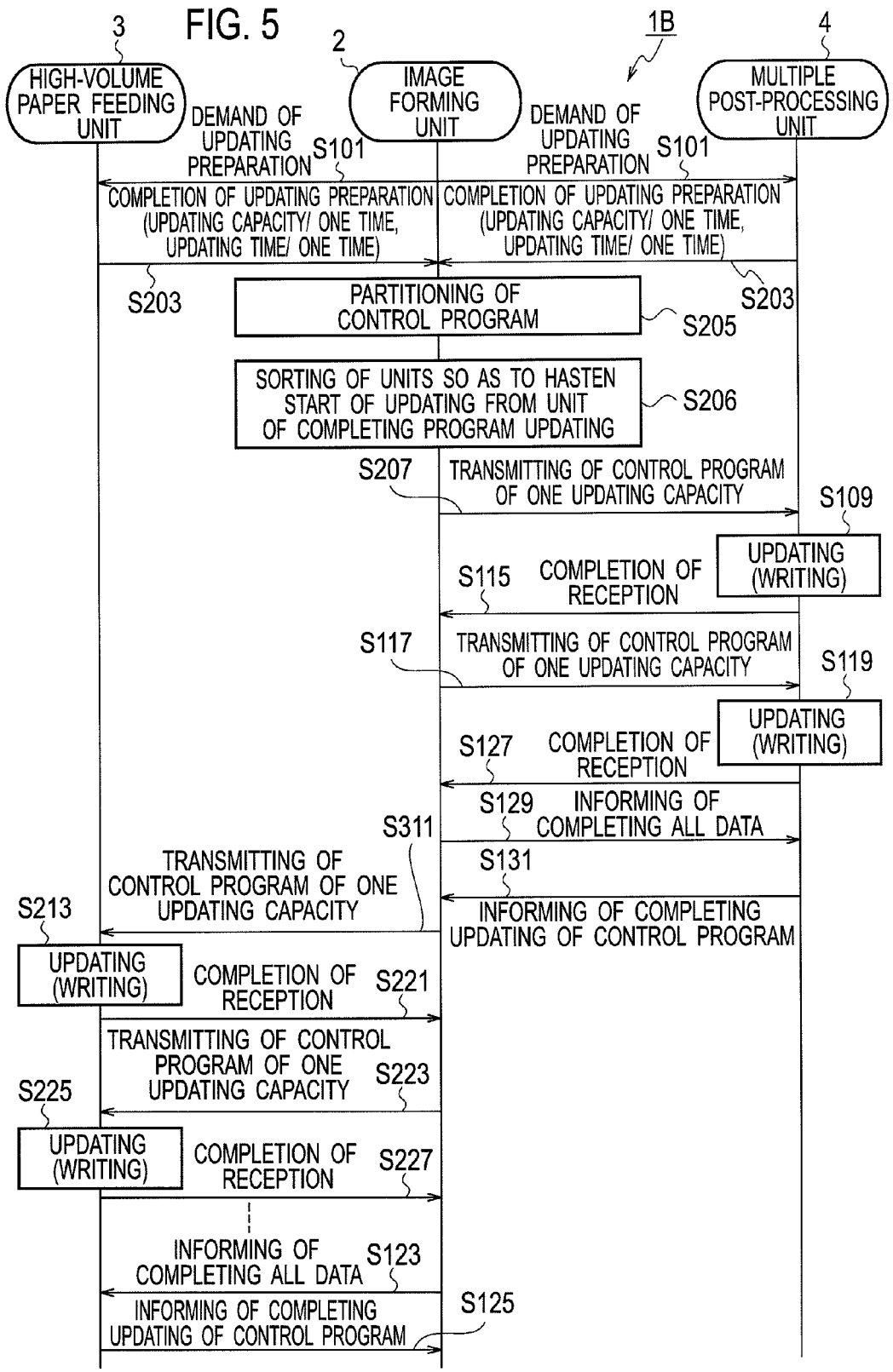

CONTROL PROGRAM UPDATING DEVICE AND STORAGE MEDIUM FOR STORING A CONTROL-PROGRAM UPDATING PROGRAM

BACKGROUND OF THE INVENTION

1. Technical Field

The present invention relates to a control program updating device for updating control programs of option units connected to the device and a storage medium for storing a control-program updating program.

2. Background of Art

In recent years, there have been widespread image forming units connectable to option units to expand its functionality with reference to customer needs.

The option units includes: a high-volume paper feeding unit arranged on the upstream side of an image forming unit to supply high volume of papers; and a multiple post-processing unit arranged on the downstream side of an image forming unit and used in combination with a post-processing equipment for performing a post processing, such as stapling, punching or cutting, on the papers printed and discharged from the image forming unit.

Such option units are connected to an image forming unit need to expand their functions or add new functions (and correct defects). In such a case, updating respective control programs installed in the option units will be attempted from the image forming unit to the option units.

Japanese Patent Publication Laid-open No. 2009-129333 proposes an information management system, including a terminal unit, an image forming unit and peripheral units (option units) sequentially-connected to the image forming unit in tandem, which executes an update process by transferring control programs to the image forming unit and the peripheral units in their connection order.

SUMMARY OF THE INVENTION

However, the above-mentioned information management system has a construction in which the peripheral units are sequentially-connected to the image forming unit in tandem. Therefore, the update process of all the peripheral units requires considerable time because the control programs are sequentially-transferred to the peripheral units in the connection order and the update process is performed in each transfer.

In order to address the issue, an object of the present invention is to provide a control program updating device executing an update process of control programs for option units in a short time and a storage medium storing a control-program updating program for the control programs.

According to one aspect of the present invention, there is provided a control program updating device connected to a plurality of option units to cause the plurality of option units to update their respective control programs, comprising: a transmitter configured to transmit the control programs to the plurality of option units, respectively; a divider configured to divide each of the control programs into one or more split control programs, based on a program capacity that the plurality of option units can update the control programs in one update process, respectively; and a transmit controller configured to allow the transmitter to transmit a set of split control programs for each control program produced by the divider to the respective option units in a predetermined order, and during updating of a split control program of an option unit, transmit a split control program to another option unit in the following order.

According to another aspect of the present invention, there is also provided a computer-readable storage medium applied to a control program updating device connected to a plurality of option units and having a transmitter for transmitting control programs to the plurality of option units, the computer-readable storage medium storing a control-program updating program for causing the control program updating device to execute an operation to cause the plurality of option units to update the control programs, respectively, the operation comprising: a dividing step of dividing each of the control programs into one or more split control programs, based on a program capacity that the plurality of option units can update the control programs in one update process, respectively; and a transmit control step of allowing the transmitter to transmit a set of split control programs for each control program produced by the divider to the respective option units in a predetermined order and, during updating of a split control program of an option unit, transmit a split control program to another option unit in the following order.

BRIEF DESCRIPTION OF THE DRAWINGS

FIG. 4 is a flowchart showing procedures in the control program updating system of the second embodiment of the present invention.

FIG. 5 is a flowchart showing procedures in the control program updating system of a third embodiment of the present invention.

EMBODIMENTS OF THE INVENTION

Several embodiments of the present invention will be described below with reference to the accompanying drawings.

First Embodiment

The first embodiment is realized by way of a control program updating system including two option units and an image forming unit as a control program updating device causing the respective option units to update control programs. Here the option units are provided to expand the function of the image forming unit.

<Overall Constitution of Control Program Updating System>

Figure 1:
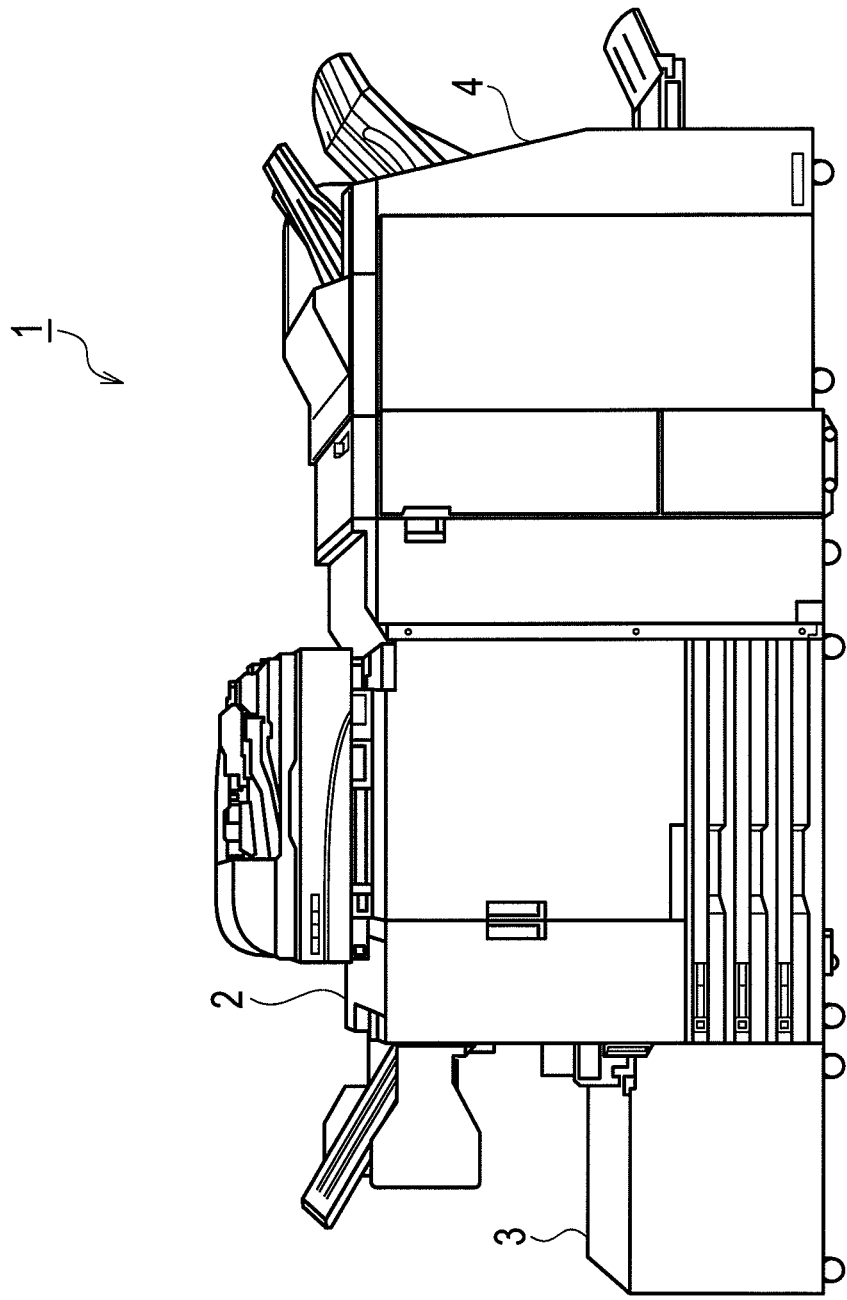
FIG. 1 is a view showing the appearance of a control program updating program system in accordance with a first embodiment of the present invention.

FIG. 1 is a view showing the appearance of such a control program updating system 1 of the first embodiment.

As shown in FIG. 1, the control program updating system 1 includes: an image forming unit 2 having a function as the control program updating device and forming an image based on a print job; a high-volume paper feeding unit 3 arranged on the upstream side of the image forming unit 2 in a paper feeding direction to supply printing papers from a mount table for mounting large volume of printing papers to the image forming unit 2; and a multiple post-processing unit 4 arranged on the downstream side of the image forming unit 2 in the paper feeding direction and used in combination with post-processing equipments for applying post-processes, such as stapling, punching or cutting, on papers printed and discharged from the image forming unit 2. The high-volume paper feeding unit 3 and the multiple post-processing unit 4 will be collectively referred to as "option units" below.

<Functional Constitution of Control Program Updating System>

Figure 2:
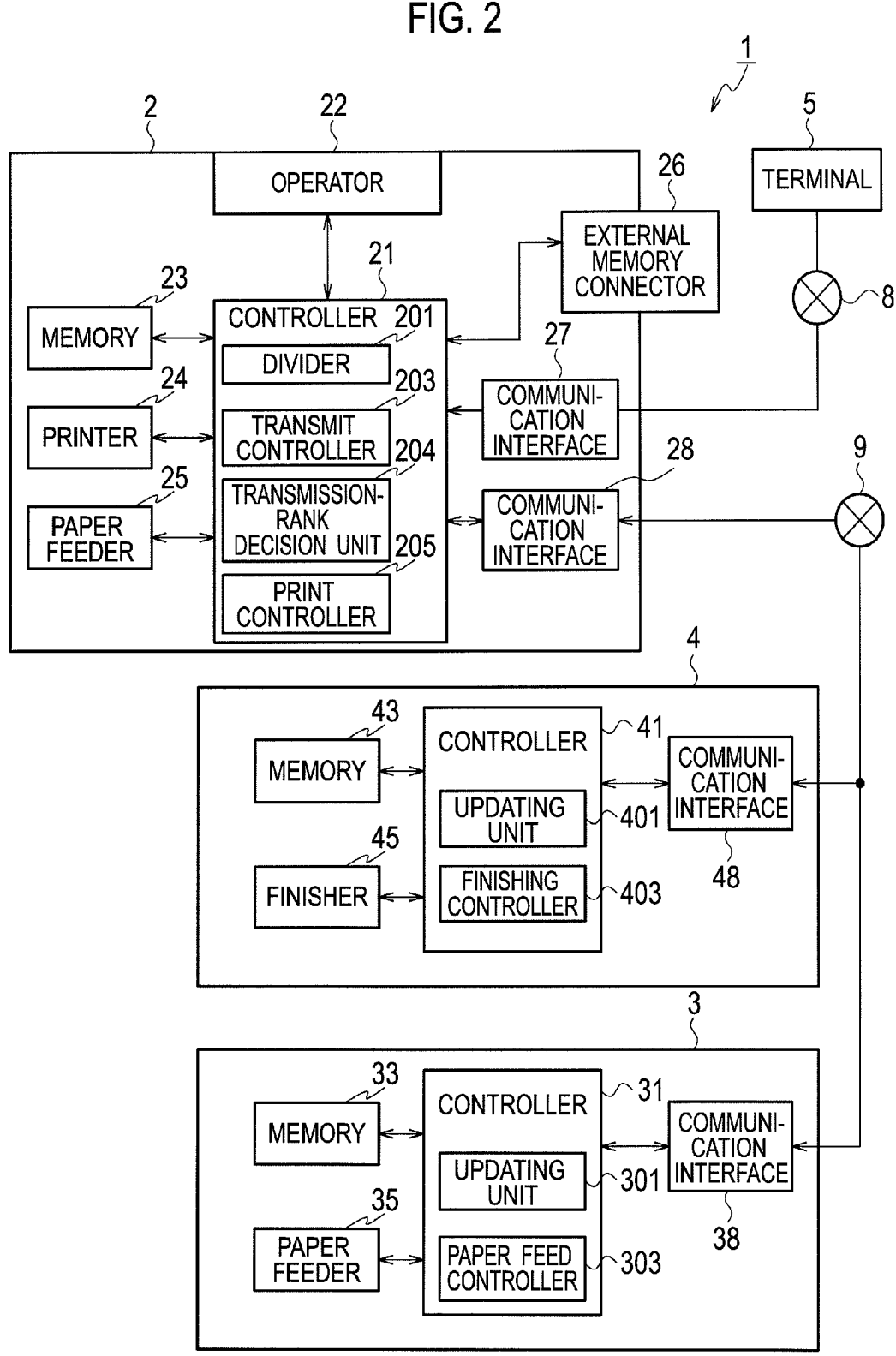
FIG. 2 is a view showing the functional constitution of the control program updating system in accordance with the first embodiment and a second embodiment of the present invention.

FIG. 2 is a view showing the functional constitution of the control program updating system 1 related to the first embodiment.

As shown in FIG. 2, the control program updating system 1 of the first embodiment includes the image forming unit 2, the high-volume paper feeding unit 3 connected to the image forming unit 2 through a control network 9, the multiple post-processing unit 4, and a terminal 5 connected to this image forming unit 2 through a network 8.

The terminal 5 generates a print job with allowing the image forming unit 2 to perform a printing operation, based on character data, graphic data, etc. produced by executing an application program installed in the terminal 5.

The image forming unit 2 is an ink-jet type printer which ejects inks, for example, a total of four color inks of cyan (C), magenta (M), yellow (Y) and black (B) through ink jet heads for performing color-printing to a printing paper W cut into predetermined dimensions, based on the print job supplied from the terminal 5.

Again, the image forming unit 2 includes a controller 21, an operator 22, a memory 23, a printer 24, a paper feeder 25, an external memory connector 26 and communication interfaces 27, 28.

The operator 22 includes a display/input panel and a variety of operating keys, for example, a start key for various operations, such as starting reading and printing, a stop key for stopping such operations, a numeric keypad for inputting the number of printings, etc. In operation, the operator 22 supplies the controller 21 with operational signals based on user's manipulations.

In the operator 22, the display/input panel includes a pressure-sensitive or electrostatic transparent touch panel arranged in front, and a liquid crystal display panel arranged behind this touch panel to display various types of display screen images. A user can carry out various operations by directly touching the surface of the touch panel through a user's finger or the like while watching a display screen image on the liquid crystal display panel.

The memory 23 is formed by a hard drive or the like to store control programs for the option units, and so on.

The printer 24 includes the ink jet heads for four color inks of cyan (C), magenta (M), yellow (Y) and black (B) and performs color-printing to a printing medium fed from the paper feeder 25 by ejecting the color inks from the ink jet heads.

The paper feeder 25 includes a feeder table on which printing papers W are stacked. From this feeder table, the uppermost printing paper W on the feeder table is supplied to the printer 24 in sequence.

The external memory connector 26 is a connector for connection with an external memory, such as a USB (Universal Serial Bus). For example, the external memory connector 26 reads out a control program stored in the external memory and successively transmits the control program to the controller 21.

The communication interface 27 is a communication interface, such as a network card. Since the controller 21 is connected to the network 8 through the communication interface 27, the controller 21 receives the print jobs or the control programs from the terminal 5.

The communication interface 28 is a communication interface, such as a network card. Since the controller 21 is connected to the control network 9 through the communication interface 28, the controller 21 transmits the control programs to the option units.

The controller 21 carries out a center control of the image forming unit 2. Again, the controller 21 includes a divider 201, a transmit controller 203, and a print controller 205. Note that, as for a remaining transmission-rank decision unit 204 shown in the figure, the explanation is eliminated here because the control program updating system contains the same unit 204 in the second embodiment mentioned later.

Based on a program capacity that the high-volume paper feeding unit 3 and the multiple post-processing unit 4 can update control programs in one updating operation, respectively, the divider 201 divides each of the control programs into a plurality of split control programs. In connection, if the program capacity of a control program is so small such that the option unit can update the control program in one update process, the divider 201 does not divide this control program. Nevertheless, for convenience sake, such a case will be referred to as a situation where the divider 201 operates to produce one split control program from the control program, in the following description.

The transmit controller 203 causes the communication interface 28 to transmit the split control programs produced for each unit 3,4 by the divider 201 to respective units 3,4 in a predetermined order and, during updating of the split control program of one unit (e.g., unit 3), transmit a split control program to the other unit (e.g., unit 4) in the following order.

The print controller 205 controls the paper feeder 25 and the printer 24 to supply the printing papers W from the paper feeder 25 to the printer 24 sequentially, and causes the printer 24 to print the fed printing papers W.

The high-volume paper feeding unit 3 includes a controller 31, a memory 33, a paper feeder 35, and a communication interface 38.

The memory 33 is formed by a hard drive or the like and also stores the control program etc.

The paper feeder 35 includes a feeder table on which printing papers W are stacked in units of e.g. several thousand pieces. From this feeder table, the uppermost printing paper W on the feeder table is supplied to the image forming unit 2, in sequence.

The communication interface 38 is a communication interface, such as a network card. Since the controller 31 is connected to the control network 9 through the communication interface 38, the controller 31 receives the control program from the image forming unit 2.

The controller 31 performs a center control of the high-volume paper feeding unit 3. In addition, the controller 31 includes an updating unit 301 and a paper feed controller 303.

The updating unit 301 updates the control program installed in the current high-volume paper feeding unit 3. In detail, the updating unit 301 updates this control program by a set of split control programs transmitted from the image forming unit 2.

The paper feed controller 303 controls paper feeding of the paper feeder 35 to the image forming unit 2.

The multiple post-processing unit 4 includes a controller 41, a memory 43, a finisher 45, and a communication interface 48.

The memory 43 is formed by a hard drive or the like and stores control program etc.

The finisher 45 performs a post-processing, such as stapling, punching or cutting, to the printing papers printed and discharged from the image forming unit 2.

The communication interface 48 is a communication interface, such as a network card. Since the controller 41 is connected to the control network 9 through this communication interface 48, the controller 41 transmits the control programs to the image forming unit 2.

The controller 41 performs a center control of the multiple post-processing unit 4. The controller 41 also includes an updating unit 401 and a finishing controller 403.

The updating unit 401 updates the control program installed in the current multiple post-processing unit 4. In detail, the updating unit 401 updates this control program by a set of split control programs transmitted from the image forming unit 2.

The finishing controller 403 controls the post-processing, such as stapling, punching or cutting, of the finisher 45.

<Operation of Control Program Updating System>

Next, the operation of the control program updating system 1 of the first embodiment will be described.

Figure 3:
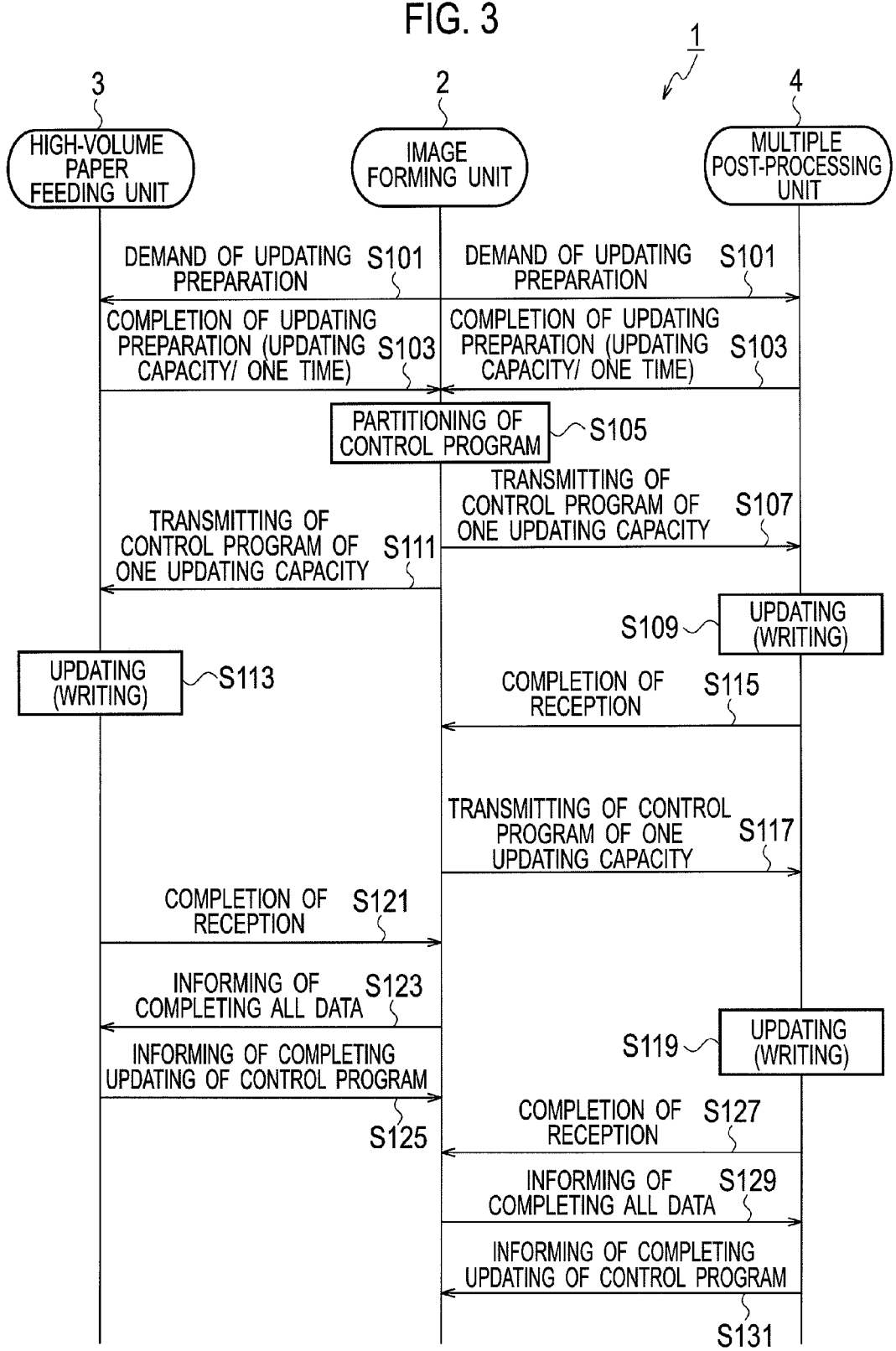
FIG. 3 is a flowchart showing procedures in the control program updating system of the first embodiment of the present invention.

FIG. 3 is a flowchart showing procedures in the control program updating system 1 of the first embodiment of the present invention.

As shown in FIG. 3, the image forming unit 2 first transmits an update request of demanding a preparation for updating the control programs to all of the option units connected to the control network 9 (step S101). In this case, since the option units correspond to the high-volume paper feeding unit 3 and the multiple post-processing unit 4, the image forming unit 2 transmits the updating requests to the high-volume paper feeding unit 3 and the multiple post-processing unit 4.

When receiving the updating requests at step S101, the option units inform the image forming unit 2 of a completion of preparing the update process (step S103). In detail, each of the high-volume paper feeding unit 3 and the multiple post-processing unit 4 informs the image forming unit 2 of a condition that the preparation for updating the control program has been completed and transmit a program capacity that each unit can update the control program in one update process.

Next, the divider 201 of the image forming unit 2 reads out the respective control programs corresponding to the option units from the memory 23 and divides the readout control programs by every program capacity that the option units can update the control programs in one update process, respectively, to produce a plurality of split control programs with respect to each control program (step S105). For instance, suppose that the control program for the multiple post-processing unit 4 has a capacity of 512 (KB) in total, while the program capacity that the unit 4 can update the control program in one update process is 256 (KB). In this case, the divider 201 will divide the control program into two split control programs. In addition, suppose that the control program for the high-volume paper feeding unit 3 has a capacity of 64 (KB) in total, while the program capacity that the unit 3 can update the control program in one update process is 128 (KB). Then, the divider 201 produces "one split control program" in accordance with the above-mentioned definition.

Next, the transmit controller 203 of the image forming unit 2 transmits a set of split control programs divided to each option unit in accordance with the predetermined order of updating the control programs (step S107). Here, as the updating order of the control programs, the priority order is exemplarily defined so that the high-volume paper feeding unit 3 comes next to the multiple post-processing unit 4. Therefore, the transmit controller 203 transmits a first-packet split control program to the multiple post-processing unit 4. It is assumed here that the order of updating the control programs is determined by a user and further stored in the memory 23 in advance.

When the multiple post-processing unit 4 receives the first-packet split control program transmitted from the image forming unit 2, the updating unit 401 updates the control program installed in the current multiple post-processing unit 4, based on the received first-packet split control program (step S109).

Then, after the update process of the first-packet split control program is completed, the updating unit 401 of the multiple post-processing unit 4 informs the image forming unit 2 of a completion of receiving the first-packet split control program (step S115).

As the image forming unit 2 has not finished the transmission of all the control program to the multiple post-processing unit 4, the image forming unit 2 transmits the remaining split control program (i.e. the second-packet split control program) to the multiple post-processing unit 4 (step S117).

Then, the updating unit 401 of the multiple post-processing unit 4 receiving the split control program updates the control program installed in the current multiple post-processing unit 4, based on the received second-packet split control program (step S119).

Meanwhile, as the multiple post-processing unit 4 requires a reasonable time for updating the control program, the image forming unit 2 makes use of the updating period of the multiple post-processing unit 4. That is, immediately after the first-packet split control program is transmitted at step S107, the image forming unit 2 transmits the split control program to the high-volume paper feeding unit 3 defined as the second unit in the order of updating the control programs (step S111).

When the high-volume paper feeding unit 3 receives the split control program transmitted from the image forming unit 2, the updating unit 301 updates the control program installed in the current high-volume paper feeding unit 3, based on the received split control program (step S113).

Then, after the update process of the split control program is completed, the updating unit 301 of the high-volume paper feeding unit 3 informs the image forming unit 2 of a completion of receiving the split control program (step S121).

Then, as the transmit controller 203 has completed to transmit all the control program to the high-volume paper feeding unit 3, the image forming unit 2 informs the high-volume paper feeding unit 3 of a completion of transmitting all data (step S123).

On receipt of the completion of transmitting all data, the high-volume paper feeding unit 3 informs the image forming unit 2 of a completion of updating the control program (step S125). Consequently, the update process of the control program for the high-volume paper feeding unit 3 is ended.

Further, at step S119, when the updating unit 401 of the multiple post-processing unit 4 has completed the update process of the control program based on the second-packet split control program on reception, the multiple post-processing unit 4 informs the image forming unit 2 of a completion of receiving the second-packet split control program (step S127).

Then, as the image forming unit 2 has completed to transmit all the control program to the multiple post-processing unit 4, the image forming unit 2 informs the multiple post-processing unit 4 of a completion of transmitting all data (step S129).

On receipt of the completion of transmitting all data, the multiple post-processing unit 4 informs the image forming unit 2 of a completion of updating the control program (step S131). Consequently, the updating operation of the control program for the multiple post-processing unit 4 is ended.

As mentioned above, the control program updating system 1 of the first embodiment includes: the divider 201 which divides the respective control programs of a plurality of option units into a plurality of split control programs based on a program capacity that each of the plurality of option units can update the respective control programs in one update process: and the transmit controller 203 which causes the communication interface 28 to transmit each set of split control programs produced by the divider 201 to the respective option units in a predetermined order and, during updating of a split control program of an option unit, transmit a split control program to another option unit in the following order during. Thus, during the updating operation of the control program by the higher-ranking option unit in the priority order, the control program updating system 1 can update the control program for the other option unit. Consequently, it is possible to accomplish the updating operation of the control programs for the option units constituting the system 1 in a short time.

Second Embodiment

Although the first embodiment has been described with an example of the control program updating system to transmit a set of split control programs to each of a plurality of option units in a predetermined order and, during updating of a split control program of an option unit, transmit a split control program to another option unit in the following order, the present invention contemplates other embodiments.

As mentioned above, the option units contain a wide variety of units, such as the high-volume paper feeding unit 3 and the multiple post-processing unit 4. Each time required for updating the respective control programs is different, according to the sort of option unit. Therefore, if updating the control programs in order of increasing a time necessary for updating the control programs, then it is possible to accomplish the updating operation of the control programs more effectively.

According to the control program updating system of the second embodiment, the order of transmitting the split control programs is decided so as to update the control programs for a plurality of option units in order of increasing a time necessary for updating the control program, and, during updating of a split control program of an option unit, the split control program is transmitted to another option unit in the following order.

<Functional Constitution of Control Program Updating System>

The functional constitution of the control program updating system related to the second embodiment will be described with reference to FIG. 2.

As shown in FIG. 2, the control program updating system 1A of the second embodiment includes the image forming unit 2, the high-volume paper feeding unit 3 connected to the image forming unit 2 through the control network 9, the multiple post-processing unit 4, and the terminal 5 connected to this image forming unit 2 through the network 8, as similar to the control program updating system 1 of the first embodiment. In this constitution, the respective elements except the image forming unit 2 are identical to those indicated with the same numerals in the control program updating system 1 of the first embodiment respectively, and therefore their descriptions are eliminated.

The image forming unit 2 includes the controller 21, the operator 22, the memory 23, the printer 24, the paper feeder 25, the external memory connector 26, and the communication interfaces 27, 28. In this constitution, the elements except the controller 21 are identical to those indicated with the same numerals in the control program updating system 1 of the first embodiment respectively, and therefore their descriptions are eliminated.

The controller 21 performs a center control of the image forming unit 2. In addition, the controller 21 includes the divider 201, the transmit controller 203, the transmission-rank decision unit 204, and the print controller 205.

Based on a program capacity that the high-volume paper feeding unit 3 and the multiple post-processing unit 4 can update control programs in one updating operation, respectively, the divider 201 divides each of the control program into a plurality of split control programs. In connection, if the program capacity of a control program is so small such that the option unit can update the control program in one update process, the divider 201 does not divide this control program. Nevertheless, for convenience sake, such a case will be referred to as a situation where the divider 201 operates to produce one split control program from the control program, in the following description.

The transmission-rank decision unit 204 decides the order of transmitting a set of split control programs to the high-volume paper feeding unit 3 and the multiple post-processing unit 4, respectively, based on: a program capacity that the high-volume paper feeding unit 3 and the multiple post-processing unit 4 can update control programs in one update process, respectively; and a time required for each of the high-volume paper feeding unit 3 and the multiple post-processing unit 4 to update the respective control programs once.

The transmit controller 203 causes the communication interface 23 to transmit the split control programs produced by the divider 201, in the order decided by the transmission-rank decision unit 204.

The print controller 205 controls the paper feeder 25 and the printer 24 to supply the printing papers W from the paper feeder 25 to the printer 24 sequentially and also causes the printer 24 to print the fed printing papers W.

<Operation of Control Program Updating System>

Next, the operation of the control program updating system 1A of the second embodiment will be described.

FIG. 4 is a flowchart showing procedures in the control program updating system 1A of the second embodiment of the present invention. Note that the processes of FIG. 4 indicated with the same numerals as those of FIG. 3 are identical to the corresponding processes of FIG. 3, and therefore their descriptions are eliminated.

On receipt of the update requests at step S101, the option units inform the image forming unit 2 of a completion of preparing the update process (step S203). In detail, each of the high-volume paper feeding unit 3 and the multiple post-processing unit 4 informs the image forming unit 2 of a fact that the preparation for updating the control program has been completed. In addition, each of these units 3, 4 transmits both a program capacity of the control program that each unit can update the control program in one update process and a time necessary for each unit to update the control program once, to the image forming unit 2.

Next, the divider 201 of the image forming unit 2 reads out the respective control programs corresponding to the option unit from the memory 23 and divides the readout control program by every program capacity that the option units can update the control programs in one update process, respectively, to produce a plurality of split control programs (step S205). For instance, suppose that the control program for the multiple post-processing unit 4 has a capacity of 512 (KB), while the program capacity that the unit 4 can update the control program in one update process is to 256 (KB). In this case, the divider 201 will divide the control program into two split control programs. In addition, suppose that the control program for the high-volume paper feeding unit 3 has a capacity of 256 (KB), while the program capacity that the unit 3 can update the control program in one update process is 64 (KB). Then, the divider 201 divides the control program into four split control programs.

Next, the transmission-rank decision unit 204 of the image forming unit 2 sorts or rearranges the transmission order so that the update process of the control programs is preferentially started from an option unit of which updating of the control program would be finished early in comparison with the other option unit (step S206).

For instance, suppose that the time necessary for the high-volume paper feeding unit 3 to update the control program once to is 50 (msec.), while the time necessary for the multiple post-processing unit 4 to update the control program once to is 20 (msec).

In this case, the time required to update the control program in the high-volume paper feeding unit 3 amounts to 200 (msec) (=50×4), while the time required to update the control program in the multiple post-processing unit 4 amounts to 40 (msec) (=20×2).

Therefore, the transmission-rank decision unit 204 establishes the priority order of the multiple post-processing unit 4 as the first unit and the high-volume paper feeding unit 3 as the second unit, as the order of updating the control programs.

Next, the transmit controller 203 of the image forming unit 2 transmits a set of split control programs divided to the option units in accordance with the order of updating the control programs, which has been decided by the transmission-rank decision unit 204 (step S207). Here, as the order of updating the control programs, the priority order is established so that the high-volume paper feeding unit 3 comes next to the multiple post-processing unit 4. Therefore, the transmit controller 203 transmits the first-packet split control program to the multiple post-processing unit 4.

Meanwhile, as the multiple post-processing unit 4 requires a reasonable time for updating the control program, the image forming unit 2 makes use of the updating period of the multiple post-processing unit 4. That is, immediately after the first-packet split control program is transmitted at step S207, the image forming unit 2 transmits the first-packet split control program to the high-volume paper feeding unit 3 defines as an option unit in the following order (second-highest) of updating the control programs (step S211).

When the high-volume paper feeding unit 3 receives the first-packet split control program transmitted from the image forming unit 2, the updating unit 301 updates the control program installed in the current high-volume paper feeding unit 3, based on the received first-packet split control program (step S213).

Then, after the update process of the split control program is completed, the updating unit 301 of the high-volume paper feeding unit 3 informs the image forming unit 2 of a completion of receiving the split control program (step S221).

Next, the image forming unit 2 receiving the information of the completion of reception transmits the second-packet split control program to the high-volume paper feeding unit 3 (step S223). Subsequently, until the fourth-packet split control program is transmitted, in other words, the transmission of all the split control programs is completed, the processes at steps S211, S213 and S221 (i.e. transmitting of a split control program, its updating and informing of completed reception) are repeated.

In this way, the option units contain a wide variety of units, such as the high-volume paper feeding unit 3 and the multiple post-processing unit 4. Each time required for updating the respective control programs is different, according to the sort of option unit. Therefore, by updating the control programs in order of increasing a time necessary for updating the control programs, it is possible to accomplish the updating operation of the control programs more effectively.

As mentioned above, the control program updating system 1A of the second embodiment includes: the transmission-rank decision unit 204 which decides the order of transmitting split control programs to a plurality of option units, respectively, based on the program capacities that the plurality of option units can update the control programs in one update process, respectively, and the times required for the plurality of option units to update the control programs once, respectively; and the transmit controller 203 which causes the communication interface 28 to transmit a set of split control programs produced by the divider 201 to each of the plurality of option units in the order decided by the transmission-rank decision unit 204 and, during updating of a split control program of an option unit, transmit a split control program to another option unit. Accordingly, the control program updating system 1A can sort or rearrange the transmission order so that the updating of the control programs is preferentially started from an option unit of which the updating of the control programs will be finished early in comparison with other option units. As a result, it is possible to accomplish the updating of the control programs more effectively and also possible to carry out the updating process of the control programs of the option units in a short time.

Third Embodiment

Although the second embodiment has been described with an example of the control program updating system which decides the order of transmitting split control programs to a plurality of option units, respectively, so as to update the control programs in order of increasing a time necessary for updating and which, during updating of a split control program of an option unit, transmits a split control program to another option unit in the following order, the present invention further contemplates a further embodiment.

According to the control program updating system 1B of the third embodiment, the order of transmitting a set of split control programs is decided so as to update control programs for a plurality of option units in order of increasing a time necessary for updating the control programs, and each set of split control programs is transmitted to the respective option units in the so-decided order.

Note that the whole units' constitution and the functional constitution of the control program updating system 1B of the third embodiment are identical to the whole constitution of FIG. 1 and the functional constitution of FIG. 2, respectively, and therefore their explanation is eliminated.

Next, the operation of the control program updating system 1B of the third embodiment will be described.

FIG. 5 is a flowchart showing procedures in the control program updating system 1B of the third embodiment of the present invention. Note that the processes of FIG. 5 indicated with the same numerals as those of FIG. 4 are identical to the corresponding processes of FIG. 4, and therefore their descriptions are eliminated.

In the control program updating system 1B of the third embodiment, during updating of the control program of an option unit, without transmitting a split control program to another option unit in the following order, the control program of the another option unit in the following order is updated after the updating operation of the control program has been completed in the preceding option unit with high priority.

In detail, when the high-volume paper feeding unit 3 informs the image forming unit 2 of a completion of updating the control program (step S131), the image forming unit 2 transmits the first-packet split control program to the high-volume paper feeding unit 3 as an option unit in the following order (second-highest) of updating the control program at step S311 of FIG. 5.

When the high-volume paper feeding unit 3 receives the first-packet split control program, the updating unit 301 updates the control program installed in the current high-volume paper feeding unit 3, based on the received first-packet split control program (step S213).

Then, when the updating operation of the first-packet split control program is completed, the updating unit 301 of the high-volume paper feeding unit 3 informs the image forming unit 2 of a completion of receiving the first-packet split control program (step S221).

Next, the image forming unit 2 receiving the information of the completion of reception transmits the second-packet split control program to the high-volume paper feeding unit 3 (step S223). Subsequently, until the fourth-packet split control program is transmitted, in other words, the transmission of all the split control programs is completed, the processes at steps S211, S213 and S221 (i.e. transmitting of the split control program, its updating and informing of completed reception) are repeated.

As mentioned above, the control program updating system 1B of the third embodiment includes the transmission-rank decision unit 204 which decides the order of transmitting the split control programs to a plurality of option units, based on the program capacities of the control programs, respective program capacities of the control programs that the plurality of option units can update the control program in the update process once respectively and the times required for the plurality of option units to update the control programs once respectively and the transmit controller 203 which causes the communication interface 28 to transmit the split control programs produced by the divider 201 to the plurality of option units in the order decided by the transmission-rank decision unit 204. Accordingly, the control program updating system 1B can sort the transmission order so that the updating the control program is preferentially started from an option unit of which updating of the control program would be finished early in comparison with the other option unit. As a result, it is possible to accomplish the updating of the control programs more effectively and also possible to simply carry out the updating process of the control programs of the option units in a short time.

Although the invention has been described by an example of the control program updating system having the ink-jet type image forming unit 2 in common with the first to third embodiments, the present invention is not limited to this configuration, and the configuration is allowable in which the control program updating system includes an image forming unit in diverse ways, such as a laser-type or stencil printing type.

Furthermore, although the control program updating system having the image forming unit has been illustrated as the control program updating device in the first to third embodiments, the present invention is not limited to this configuration, and the control program updating device may be formed by an equipment requiring to update the control program, for example, an AV (Audio Visual) equipment instrument, home electric appliances, etc.

In addition, the above-mentioned embodiments may be embodied by allowing a computer to execute a control-program updating program installed therein. That is, this control-program updating program may constitute a control program updating device since the control-program updating program is read out from a record medium and further executed by a controller or since the control-program updating program is transmitted through a communication network for installation and further executed by a controller.

The present application claims the benefit of priority under 35 U.S.C. §119 to Japanese Patent Application No. 2011-247350, filed on Nov. 11, 2011, the entire content of which is incorporated herein by reference.

What is claimed is:

1. A control program updating device connected to a plurality of option units to cause the plurality of option units to update their respective control programs, comprising:
    a transmitter configured to transmit the respective control programs to the plurality of option units;
    a divider configured to divide each of the control programs into one or more split control programs, based on a program capacity of each option unit for one update process; and
    a transmit controller configured to allow the transmitter to transmit a set of split control programs for each control program produced by the divider to the respective option unit in a predetermined order and to allow the transmitter to transmit a split control program to at least one other option unit in the plurality before all of the split control programs in the set of one respective option unit are transmitted to the one respective option unit.

2. The control program updating device of claim 1, further comprising:
    a transmission-rank decision unit configured to decide an order of transmitting the split control programs to the plurality of option units, based on: a program capacity of each option unit for one update process; and a time required of each option unit for one update process, wherein
    the transmit controller allows the transmitter to transmit the set of split control programs for each control program produced by the divider to the respective option units, in the order decided by the transmission-rank decision unit.

3. A non-transitory, computer-readable storage medium applied to a control program updating device connected to a plurality of option units and having a transmitter for transmitting control programs to the plurality of option units, the non-transitory, computer-readable storage medium storing a control-program updating program for causing the control program updating device to execute an operation to cause the plurality of option units to update the control programs, respectively, the operation comprising:
    a dividing step of dividing each of the control programs into one or more split control programs, based on a program capacity of each option unit for one update process; and
    a transmit control step of causing the transmitter to transmit a set of split control programs for each control program produced by the divider to the respective option unit in a predetermined order and causing the transmitter to transmit a split control program to at least one other option unit in the plurality before all of the split control programs in the set of one respective option unit are transmitted to the one respective option unit.

4. The non-transitory, computer-readable storage medium of claim 3, wherein the operation further comprises a transmission-rank decision step of deciding an order of transmitting the split control programs to the plurality of option units, based on: a program capacity of each option unit for one update process; and a time required of each option unit for one update process, wherein the transmit control step allows the transmitter to transmit a set of split control programs for each control program produced at the dividing step to the respective option units, in the order decided at the transmission-rank decision step.

* * * * *